United States Patent [19]

Schulz et al.

[11] Patent Number: 4,540,743

[45] Date of Patent: Sep. 10, 1985

[54] ACYLATION OF POLYVINYL ALCOHOLS, AND PHOTOPOLYMERIZABLE AND/OR PHOTOCROSSLINKABLE MIXTURES CONTAINING PRODUCTS THUS ACYLATED

[75] Inventors: Guenther Schulz, Ludwigshafen; Guenther Wallbillich, Schifferstadt, both of Fed. Rep. of Germany

[73] Assignee: BASF Aktiengesellschaft, Fed. Rep. of Germany

[21] Appl. No.: 624,094

[22] Filed: Jun. 25, 1984

[30] Foreign Application Priority Data

Jun. 25, 1983 [DE] Fed. Rep. of Germany ....... 3322993

[51] Int. Cl.³ .............................................. C08F 8/10
[52] U.S. Cl. ................................. 525/61; 204/159.15; 525/59
[58] Field of Search ................ 525/61, 59; 204/159.15

[56] References Cited

U.S. PATENT DOCUMENTS 2,759,909  8/1956  Hiatt et al. ............................ 525/61
3,220,960 11/1965  Wichterle et al. .................... 260/2.5
3,427,161  2/1969  Laridon et al. ....................... 96/35.1
3,560,465  2/1971  Reynolds ............................ 260/91.3
4,140,853  2/1979  Vorbrueggen ........................ 544/60

FOREIGN PATENT DOCUMENTS 1958954 11/1978 Fed. Rep. of Germany .
834337   7/1960 United Kingdom .

OTHER PUBLICATIONS

Houben-Weyl, "Methoden der Organischen Chemie", 4.Auflage, Band XIV/2, S. 725-728, 1963, Herlinger et al.

G. Hofle, W. Steglich, H. Vorbruggen, "Angewandte Chemie 90", 1978, S. 602-615.

Primary Examiner—Harold D. Anderson
Attorney, Agent, or Firm—Keil & Weinkauf

[57] ABSTRACT

The acylation of polyvinyl alcohols is carried out by a process in which these alcohols are esterified with an activated carboxylic acid derivative in the presence of, as the catalyst, an aminopyridine derivative of the general formula (I)

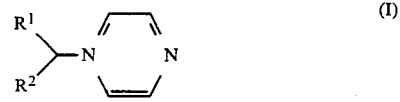

where $R^1$ and $R^2$ are each alkyl, or $R^1$ and $R^2$ together form an alkylene radical. The acylation is particularly advantageously carried out in the heterogeneous phase. The acylated polyvinyl alcohols prepared in this manner are used in photopolymerizable and/or photocrosslinkable mixtures.

13 Claims, No Drawings

ACYLATION OF POLYVINYL ALCOHOLS, AND PHOTOPOLYMERIZABLE AND/OR PHOTOCROSSLINKABLE MIXTURES CONTAINING PRODUCTS THUS ACYLATED

The present invention relates to an improved process for the acylation of polyvinyl alcohols by esterifying these alcohols with an activated carboxylic acid derivative in the presence of a tertiary amine, and to photopolymerizable and/or photocrosslinkable mixtures which contain polyvinyl alcohols acylated in this manner.

It is known that polyvinyl alcohols can be esterified with activated carboxylic acid derivatives (cf. Houben-Weyl, Methoden der organischen Chemie, 4th edition, Volume XIV/2, pages 725–728, G. Thieme Verlag, Stuttgart, 1963). British Pat. No. 834,337 and DE-A-No. 1 522 359 describe photopolymerizable and/or photocrosslinkable mixtures of polyvinyl alcohols possessing acrylate and methacrylate groups. According to German Pat. No. 1,065,621, polyvinyl alcohols are esterified with acrylic or methacrylic anhydride so that not more than 2% of the hydroxyl groups are esterified, and the resulting products are polymerized to form gels. U.S. Pat. No. 3,560,465 describes the problems involved in the preparation of soluble photosensitive esterification products of polyvinyl alcohols. For the preparation of improved photosensitive recording materials for the production of printing plates and relief plates, DE-A-No. 31 44 905 proposes the use of polyvinyl alcohol derivatives obtained by reacting polyvinyl alcohol in the heterogeneous phase with a large molar excess of acrylic or methacrylic anhydride.

However, the conventional processes for the acylation of polyvinyl alcohols all suffer from disadvantages, some of them substantial. For example, the processes carried out in homogeneous phase in solution are generally accompanied by side reactions, and give products which contain a relatively large amount of impurities. Pyridine is employed in most cases as a suspending agent or solvent, and its use requires very expensive safety measures to avoid undesirable pollution. The acylation of polyvinyl alcohol in the heterogeneous phase generally results in low yields and low degrees of acylation, and the product properties are extremely difficult to reproduce. Many of the products prepared in the homogeneous or heterogeneous phase do not possess the properties desirable with regard to use in photosensitive, photopolymerizable or photocrosslinkable mixtures, and are therefore often useless in practice for this purpose. If, in order to avoid these disadvantages, the reaction is carried out in the heterogeneous phase using a large excess of acylating agent, as proposed in DE-A-No. 31 44 905, large amounts of starting materials are required, which consequently make the preparation more expensive.

It is an object of the present invention to provide an improved process for the acylation of polyvinyl alcohols, which in particular is simple to carry out, permits a high degree of acylation, gives high yields and very pure products in the acylation, and can be carried out in a highly reproducible manner with regard to product properties. It is a particular object of the present invention to provide a process for the acylation of polyvinyl alcohols which gives products which can advantageously be used in photosensitive, photopolymerizable or photocrosslinkable mixtures, as employed, for example, for the production of coatings, printing plates, relief plates, photoresists, etc.

We have found, surprisingly, that this object is achieved by a process for the acylation of polyvinyl alcohols with an activated carboxylic acid derivative, wherein the esterification is carried out in the presence of a particular aminopyridine as a catalyst.

The present invention accordingly relates to a process for the acylation of polyvinyl alcohols by esterifying these alcohols with an activated carboxylic acid derivative in the presence of a tertiary amine, wherein the esterification is carried out in the presence of a pyridine derivative of the formula (I)

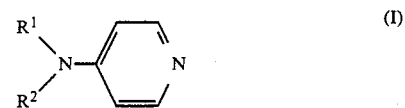

where $R^1$ and $R^2$ are each alkyl, or $R^1$ and $R^2$ together form an alkylene radical.

The present invention furthermore relates to photopolymerizable and/or photocrosslinkable mixtures which contain acylated polyvinyl alcohols prepared by this novel process.

The alkylaminopyridines are well known as effective acylation catalysts in esterification reactions of low molecular weight compounds (cf. DE-A-No. 19 58 954 and G. Höfle, W. Steglich and H. Vorbrüggen, Angew. Chem. 90 (1978), 602–615). However, it was not at all obvious to a skilled worker that the aminopyridines could also very advantageously be used as catalysts for the esterification of polyvinyl alcohols. Instead, it had to be assumed that, in the heterogeneous-phase esterification reaction of high molecular weight polyvinyl alcohols, steric hindrance and diffusion restrictions would mean that the hydroxyl groups of the said alcohols would not be readily accessible for the acylating agent, so that low degrees of acylation, unsatisfactory yields, poor reproducibility, etc. were caused by reaction restrictions which usually could not be overcome by catalysis. Surprisingly, we have found that, by means of the novel use of the aminopyridines as catalysts in the esterification of polyvinyl alcohols, high degrees of acylation and high yields in the acylation can be achieved simply and readily, even in the reaction in the heterogeneous phase. The amount of acylating agent used can be substantially reduced compared with the conventional processes, troublesome side reactions resulting in contamination of the products can substantially be suppressed without it being necessary, for example, to carry out an expensive purification of the acylating agent beforehand, and the resulting acylated polyvinyl alcohols possess improved, reproducible properties, have a wide range of application and in particular are very suitable for use in photosensitive, photopolymerizable and/or photocrosslinkable mixtures.

For the purposes of the present invention, polyvinyl alcohols are, very generally, polymers which are soluble or dispersible in water and have repeating —CH$_2$CH(OH)— structural units in the polymer main chain. These polymers include polyvinyl alcohol itself, copolymers of vinyl alcohol units and other comonomer units, and derivatives, e.g. ethers and/or esters, of polyvinyl alcohols. In this context, reference may be made to the relevant prior art. Particularly suitable polyvinyl alcohols are the conventional partially hydrolyzed polyvinyl esters of monocarboxylic acids of 2 to 4 carbon atoms, especially the partially hydrolyzed polyvinyl acetates or polyvinyl propionates. The degree of hydrolysis of the polyvinyl esters used according to the invention is advantageously above 75, preferably from 80 to 95, mole %. The polyvinyl alcohols furthermore include the modified polyvinyl alcohols or the modified, partially hydrolyzed polyvinyl esters, for example copolymers of polyvinyl alcohol or of partially hydrolyzed polyvinyl acetate, which copolymers can contain from 10 to 30% by weight, based on the copolymer, of chemically bonded ethylene oxide units. These copolymers preferably contain more than 60 mole %, based on the copolymer, of OH groups. The molecular weight of the polyvinyl alcohols used in the novel process can be varied within wide limits, and is preferably from 15,000 to 100,000, in particular from 20,000 to 50,000 (number average). It is also possible to use mixtures of different polyvinyl alcohols.

Suitable acylating agents for the novel process are all activated carboxylic acid derivatives which are conventionally used for the esterification of alcohols, activated carboxylic acid derivatives derived from carboxylic acids of 2 to 12 carbon atoms being particularly suitable. Preferably used acylating agents are the carboxylic anhydrides, which can be derived from saturated or unsaturated, monobasic or polybasic carboxylic acids. Examples of saturated carboxylic anhydrides are acetic anhydride, propionic anhydride and the like, for example for the reacylation of partially hydrolyzed polyvinyl acetates or polyvinyl propionates. Where dicarboxylic anhydrides, e.g. succinic anhydride or phthalic anhydride, are used, the half-esters of the dicarboxylic acids are obtained. In this manner, free carboxyl groups can be introduced into the polyvinyl alcohol. Starting from appropriate activated carboxylic acid derivatives, it is also possible in this way to modify the polyvinyl alcohols with other reactive functional groups. Particularly preferred activated carboxylic acid derivatives for the novel process, particularly with regard to using the resulting products in photosensitive mixtures, are the activated derivatives, in particular the anhydrides, of olefinically unsaturated carboxylic acids of 3 to 10 carbon atoms. These include the derivatives of cinnamic acid, maleic acid and fumaric acid. Compounds which are particularly advantageously used, in accordance with the invention, for the acylation, are the anhydrides of $\alpha,\beta$-olefinically unsaturated carboxylic acids of 3 or 4 carbon atoms. These include, in particular, acrylic anhydride and methacrylic anhydride, as well as, for example, crotonic anhydride.

The amount of acylating agent used depends on the desired degree of acylation, which in turn in general depends on the intended use of the resulting products, and can usually be varied within wide limits. In general, where partially hydrolyzed polyvinyl esters having a high degree of hydrolysis are used, the reaction is also carried out to a relatively high degree of acylation, whereas when polyvinyl esters having a low degree of hydrolysis are employed, the degree of acylation is lower. In a preferred embodiment of the novel process, acylation of the polyvinyl alcohols is terminated before they lose their water-solubility. For example, when the preferred olefinically unsaturated carboxylic anhydrides are used, the process is advantageously carried out so that the degree of acylation of the converted polyvinyl alcohols is from 1 to 12, in particular from 2 to 10, mole %. In contrast to the conventional esterification processes for polyvinyl alcohols, the use, according to the invention, of the aminopyridines as catalysts makes it possible to carry out the novel process so that the resulting polyvinyl alcohols have a higher degree of acylation, i.e. also have a higher functionality, without the products losing their water-solubility as a result. Another advantage of the novel process is that impurities which are usually present in the acylating agents do not interfere with the esterification reaction and lead to only a low level of undesirable side reactions. Hence, pure products are obtained even for high possible degrees of acylation and when industrially available activated carboxylic acid derivatives are used in the novel process. In contrast to the process disclosed in DE-A-No. 31 44 905, by means of which the acylation of the polyvinyl alcohols is to be carried out in the heterogeneous phase using a large molar excess of the acylating agent, the process according to the invention can be carried out using much smaller amounts of acylating agents. In general, the acylating agent is employed, in accordance with the invention, in an amount which corresponds to not more than twice, preferably from 1.1 to 1.5 times, the molar amount required for the desired degree of acylation. For example, from 10 to 100, preferably from 15 to 30, % by weight, based on the polyvinyl alcohol used, of acylating agent can be employed.

The catalysts used according to the invention are aminopyridines of the general formula (I)

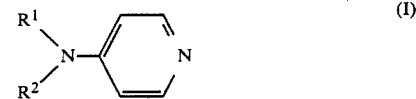

where $R^1$ and $R^2$ are each alkyl, in particular alkyl of 1 to 4 carbon atoms, or $R^1$ and $R^2$ together form an alkylene radical, preferably an alkylene radical of 4 or 5 carbon atoms. Examples of preferred catalysts are p-dimethylaminopyridine and p-pyrrolidinopyridine. The aminopyridines and their preparation are known per se (cf. Angew. Chem. 90 (1978), 602, DE-A-No. 19 58 954 and DE-A-No. 25 17 774). The catalyst concentration can be varied within wide limits and is, for example, from 0.1 to 15, preferably from 0.5 to 5, % by weight, based on the polyvinyl alcohol employed, of aminopyridine.

In the novel process, other tertiary amines, e.g. pyridine or triethylamine, can be used concomitantly as auxiliary bases, in addition to the stated catalyst, the amount of these auxiliary bases being not more than 50, preferably from 5 to 20, % by weight, based on the polyvinyl alcohol used. One of the factors which determine the amount of auxiliary base used is the type of acylating agent. In general, the maximum amount of auxiliary base used must not exceed from 50 to 60 mole % of the stoichiometric amount of acid formed. One of the factors determining whether an auxiliary base is present or absent during the novel process is the method of carrying out the reaction. For example, if, as is advantageous, the reaction is carried out in an aromatic hydrocarbon, e.g. toluene, as a solvent or dispersant, the addition of these auxiliary bases has no significant advantages.

Even when the esterification reaction of the polyvinyl alcohol can be carried out using the acylating agent alone, the process is preferably carried out in the presence of a solvent or dispersant. The reaction of the polyvinyl alcohol with the acylating agent is particularly advantageously carried out in the heterogeneous phase, by suspending the polyvinyl alcohol in an aprotic dispersant and reacting it, in this suspension, with the acylating agent in the presence of an aminopyridine as the catalyst, with simultaneous vigorous stirring. Particularly suitable aprotic dispersants are low molecular weight halohydrocarbons, low molecular weight aliphatic ketones and aliphatic, cycloaliphatic and/or aromatic hydrocarbon solvents. Examples of such dispersants are methylene chloride, chloroform, carbon tetrachloride and trichloroethane; acetone, methyl ethyl ketone and methyl isobutyl ketone; and hexane, cyclohexane and gasoline fractions. Methylene chloride and acetone are very useful, while the aromatic hydrocarbon solvents, such as benzene, xylene and, preferably, toluene, have proven particularly advantageous. The aprotic dispersants are advantageously used in amounts such that the suspension consisting of the polyvinyl alcohol and the dispersant contains from 30 to 75, in particular from 40 to 65, % by weight, based on the sum of polyvinyl alcohol and dispersant, of the dispersant. Where olefinically unsaturated activated carboxylic acid derivatives are used as the acylating agents, it has proven advantageous to carry out the acylation of the polyvinyl alcohol in the presence of a conventional polymerization inhibitor, e.g. di-tert.-butyl-p-cresol.

The reaction temperature is generally kept at from 10° to 100° C., preferably from 40° to 80° C. The reaction time, which depends on, inter alia, the desired degree of acylation, is usually from 2 to 40, in particular from 4 to 20, hours.

Working up and isolation of the reaction product are carried out in a conventional manner. When the acylation reaction is carried out in the heterogeneous phase, the insoluble reaction product of the polyvinyl alcohol need only be filtered off, washed and dried. Thus, the working up procedure is very simple and economical in this case, since the polymer does not have to be precipitated, as is necessary in the case of, for example, the reaction in solution, and an expensive purification of the solvent before it is reused is also unnecessary; dispensing with these steps does not have an adverse effect on the purity and quality of the products.

The novel process for the acylation of polyvinyl alcohols is useful in general for introducing any desired functional groups into the polyvinyl alcohol by catalyzed esterification with appropriate acid derivatives. This permits the chemical and physical properties of the polyvinyl alcohols to be modified selectively and in a manner which allows easy monitoring, very pure products being formed. The novel acylation process also permits different functional side groups to be introduced into the polyvinyl alcohol chain in several successive steps. It is also useful, for example, for analytical purposes, as an improvement of the method due to R. L. Adelman and R. C. Ferguson, J. Polym. Sci., Polym. Chem. Ed., 13 (1975), 891. The products obtained according to the invention are of constant reproducible quality and are distinguished, even in the case of high degrees of acylation, by, inter alia, their purity and their particularly low content of absorbing impurities; they can therefore be used very advantageously in photopolymerizable and/or photocrosslinkable mixtures. The composition of such mixtures depends on both the intended use and the type of acylated polyvinyl alcohol employed.

Very advantageous photopolymerizable and/or photocrosslinkable mixtures are those which contain acylated polyvinyl alcohols possessing olefinically unsaturated, photopolymerizable and/or photocrosslinkable ester groups, as formed in, for example, the reaction of the polyvinyl alcohols with activated derivatives of olefinically unsaturated carboxylic acids, in particular acrylic anhydride, methacrylic anhydride or crotonic anhydride. Such polyvinyl alcohol derivatives possessing olefinically unsaturated, photopolymerizable and/or photocrosslinkable side groups can be the sole essential component of the photopolymerizable and/or photocrosslinkable mixture, apart from a suitable photoinitiator and conventional nonpolymerizable additives. However, these mixtures can also contain further polymeric binders, for example other polyvinyl alcohols without olefinic double bonds, or other olefinically unsaturated, photopolymerizable, in particular low molecular weight, compounds, for example the conventional photopolymerizable monomers and/or oligomers. If the photopolymerizable or photocrosslinkable mixtures based on acylated polyvinyl alcohols possessing olefinically unsaturated, photopolymerizable or photocrosslinkable side groups contain further polymeric binders and/or other photopolymerizable, in particular low molecular weight, compounds, these binders and photopolymerizable compounds should, as is generally required, be compatible with the acylated polyvinyl alcohol.

In another embodiment, the photopolymerizable and/or photocrosslinkable mixtures can contain acylated polyvinyl alcohols into which other functional groups have been introduced by means of the novel acylation process. These include, for example, the polyvinyl alcohols which possess free carboxyl side groups, as formed in the acylation of polyvinyl alcohols with activated derivatives of dicarboxylic acids, in particular dicarboxylic anhydrides. The free carboxyl groups in the polyvinyl alcohols provide, for example, better adhesion of the photopolymerizable and/or photocrosslinkable mixtures on metallic substrates. Photosensitive mixtures of this type can therefore advantageously be used as coating or resist materials, or for printing plates in which the photosensitive, relief-forming layer is applied onto, for example, a metal or steel base. Photopolymerizable and/or photocrosslinkable mixtures which contain acylated polyvinyl alcohols possessing functional groups, in particular free carboxyl groups, can contain further, compatible polymeric binders, for example other, unmodified polyvinyl alcohols, other modified polyvinyl alcohols, and polyvinyl alcohols possessing olefinically unsaturated, photopolymerizable and/or photocrosslinkable double bonds in side groups; in general, they also contain low molecular weight, i.e. monomeric or oligomeric, olefinically unsaturated photopolymerizable compounds. In this case too, the polymers and monomers or oligomers present in the photopolymerizable and/or photocrosslinkable mixture should be substantially compatible with one another.

Examples of other suitable polymer binders which can be present in the photopolymerizable and/or photocrosslinkable mixtures, in addition to the polyvinyl alcohols acylated according to the invention, are unmodified polyvinyl alcohols, other polyvinyl alcohol derivatives, e.g. oxyethylated polyvinyl alcohols (cf. for example U.S. Pat. No. 4,272,611), polyvinylpyrrolidone, N-vinylpyrrolidone copolymers, e.g. N-vinylpyrrolidone/vinyl acetate copolymers, cellulose derivatives, starch, starch derivatives and acrylic acid copolymers. Whether these further polymeric binders are present in addition to the polyvinyl alcohols acylated according to the invention, and the amounts in which they are used, depend on the desired properties and the intended use of the photopolymerizable and/or photocrosslinkable mixtures. The ratio can therefore vary within wide limits.

Photopolymerizable, ethylenically unsaturated low molecular weight compounds which can be present in the photopolymerizable and/or photocrosslinkable mixtures are the monomers and/or oligomers which are known per se, have a molecular weight as high as 5,000, preferably as high as 3,000, are conventionally used for photosensitive mixtures of the type under discussion, and are described in, for example, the literature cited at the outset. Examples of preferred polymerizable ethylenically unsaturated low molecular weight compounds which can contain one or more ethylenically unsaturated double bonds are those which contain hydroxyl groups, amide groups and/or polyalkylene glycol structural units. These include, in particular, mono- and polyacrylates and/or methacrylates of monohydric or polyhydric low molecular weight alcohols, e.g. hydroxyalkyl acrylate or methacrylate, where alkyl is of 1 to 8 carbon atoms, such as β-hydroxyethyl acrylate or methacrylate, β-hydroxypropyl acrylate or methacrylate, ethylene glycol diacrylate or dimethacrylate, monoacrylates, monomethacrylates, diacrylates or dimethacrylates of polyethylene glycols or polypropylene glycols having molecular weights as high as about 500, butane-1,4-diol diacrylate or dimethacrylate, 1,1,1-trimethylolpropane triacrylate or trimethacrylate, or glycerol diacrylate, dimethacrylate, triacrylate or trimethacrylate. Other suitable compounds are low molecular weight urethane-acrylate prepolymers, as can be prepared by, for example, reacting hydroxyalkyl acrylates or methacrylates (e.g. β-hydroxyethyl acrylate or methacrylate or β-hydroxypropyl acrylate or methacrylate), organic diisocyanates (e.g. hexamethylene diisocyanate, toluylene diisocyanate or isophorone diisocyanate) and, if appropriate, low molecular weight aliphatic diols as chain-lengthening agents. If ethylenically unsaturated low molecular weight compounds are used in the photopolymerizable and/or photocrosslinkable mixtures, they are generally present in the mixture in amounts of from 10 to 90, preferably from 30 to 60, % by weight, based on the mixture.

The photopolymerizable and/or photocrosslinkable mixtures contain in general from 0.001 to 10, preferably from 0.1 to 5, % by weight, based on the stated mixture, of photopolymerization initiators, suitable initiators of this type being the photoinitiators conventionally used for photosensitive mixtures. Examples of such initiators are acyloins and their derivatives, e.g. benzoin, benzoin alkyl ethers, α-methylolbenzoin and its ethers, and α-methyl benzoin and its ethers; vicinal diketones and their derivatives, e.g. benzil ketals, in particular benzil dimethyl ketal; and particularly advantageously acylphosphine oxide compounds of the type described in, for example, DE-A-No. 29 09 992 and DE-A-No. 31 14 341. The photopolymerizable and/or photocrosslinkable mixtures can furthermore contain conventional additives and/or assistants in conventional amounts. These include, in particular, thermal polymerization inhibitors, dyes, pigments, plasticizers, processing assistants, etc.

The novel photopolymerizable and/or photocrosslinkable mixtures can be prepared in a conventional manner by mixing the components, for example in solution, to give a homogeneous mixture, and can advantageously be used as coating materials, e.g. photopolymerizable surface coatings, for paints and leveling compounds, for the production of fluorescent layers in color image tubes, of coatings with relief-like decorations, and of photoresists for the production of electronic components and printed circuits, for the production of masks and etch resists for use in chemical milling techniques, and in particular for the production of photosensitive recording materials, in particular for photopolymerizable printing plates for letterpress, gravure, lithographic or screen printing. When the novel photopolymerizable and/or photocrosslinkable mixtures are used for the production of photosensitive recording materials, the components of the mixture are advantageously matched with one another so that the stated mixture as such is water-soluble or water-dispersible, and the photosensitive recording materials can therefore be washed out with water or an aqueous developer after imagewise exposure. Furthermore, a particular advantage of the novel photopolymerizable and/or photocrosslinkable mixtures is that, in spite of the fact that they can be washed out with water before exposure, they are very water-resistant after photopolymerization or photocrosslinking.

The Examples which follow illustrate the invention. Parts and percentages are by weight, unless stated otherwise. The molecular weights of the polyvinyl alcohols were determined via the viscosities, measured on a 4 percent strength by weight aqueous solution at 20° C. in a Höppler viscometer, the number average molecular weights being stated. The comparative experiments were carried out in such a way that the concentration, based on the total liquid phase, of the polyvinyl alcohol used was kept constant.

EXAMPLE 1

100 parts of a partially hydrolyzed polyvinyl acetate having a degree of hydrolysis of 82 mole % and a mean molecular weight of 20,000 were dispersed in a mixture of 160 parts of acetone, 25 parts of crude acrylic anhydride (containing about 5 parts of acrylic acid), 15 parts of triethylamine, 1 part of di-tert.-butyl-p-cresol and 1 part of p-pyrrolidinopyridine, and the dispersion was stirred for 12 hours at 60° C. The insoluble reaction product of the polyvinyl alcohol was then filtered off, washed with acetone and dried. The resulting acylated polyvinyl alcohol contained 9 mole % of acrylic ester groups.

COMPARATIVE EXPERIMENT A

The procedure described in Example 1 was followed, except that in this case triethylamine and p-pyrrolidinopyridine were not used and the amount of acetone was increased to 170 parts. In spite of a reaction time of 24 hours, the content of acrylic ester groups in the resulting reaction product was only 1.5 mole %. The acrylic anhydride used was virtually completely consumed.

EXAMPLE 2

100 parts of a partially hydrolyzed polyvinyl acetate having a degree of hydrolysis of 88 mole % and a mean molecular weight of 25,000 were dispersed in a mixture of 160 parts of acetone, 25 parts of crude methacrylic anhydride (containing 7 parts of free methacrylic acid as an impurity), 1 part of di-tert.-butyl-p-cresol, 15 parts of pyridine and 2 parts of p-dimethylaminopyridine, and the dispersion was stirred for 12 hours at 60° C. Filtration, washing with acetone and drying gave an acylated polyvinyl alcohol which contained 7 mole % of methacrylic ester groups as copolymerized units.

COMPARATIVE EXPERIMENT B

The procedure described in Example 2 was followed, except that in this case the use of pyridine and p-dimethylaminopyridine was dispensed with, the amount of methacrylic anhydride was increased from 25 to 50 parts, and the amount of acetone used as a dispersant was 140 parts. After a reaction time of 25 hours at 60° C., the content of methacrylic ester groups in the washed and dried reaction product was only 1.7 mole %.

EXAMPLE 3

100 parts of a partially hydrolyzed polyvinyl acetate having a degree of hydrolysis of 88 mole % and a mean molecular weight of 50,000 were dispersed in 160 parts of acetone, 25 parts of crotonic anhydride (containing 3 parts of free crotonic acid as an impurity), 1 part of di-tert.-butyl-p-cresol, 10 parts of triethylamine and 1 part of p-dimethylaminopyridine, and the dispersion was stirred for 6 hours at 60° C. The reaction product was filtered off, washed and dried, and the resulting polyvinyl alcohol was found to contain 11 mole % of bonded crotonic ester groups. Like the starting material, the reaction product was readily soluble in water.

COMPARATIVE EXPERIMENT C

The procedure described in Example 3 was followed, except that in this case the addition of p-dimethylaminopyridine and of triethylamine was dispensed with, and the amount of crotonic anhydride was increased from 25 to 50 parts, the crotonic anhydride containing 6 parts of free crotonic acid as an impurity. After a reaction time of 20 hours at 60° C., the content of bonded crotonic ester groups in the polyvinyl alcohol was only 4.5 mole %; the product was no longer soluble in water, but was only soluble in a 1:1 water/methanol mixture.

EXAMPLE 4

100 parts of a partially hydrolyzed polyvinyl acetate having a degree of hydrolysis of 88 mole % and a mean molecular weight of 16,000 were dispersed in a mixture of 180 parts of toluene, 20 parts of methacrylic anhydride (containing 5.5 parts of free methacrylic acid as an impurity), 1 part of di-tert.-butyl-p-cresol and 1 part of p-dimethylaminopyridine, and the dispersion was stirred for 8 hours at 80° C. The insoluble reaction product was filtered off, washed with toluene and acetone, and dried. It contained 5 mole % of bonded methacrylic ester groups.

COMPARATIVE EXPERIMENT D

The procedure described in Example 1 was followed, except that in this case the addition of p-pyrrolidinopyridine was dispensed with and the amount of triethylamine was increased to 16 parts. The resulting reaction product contained only about 0.8 mole % of acrylic ester groups as copolymerized units.

COMPARATIVE EXPERIMENT E

Example 4 was repeated, except that in this case the addition of p-dimethylaminopyridine was dispensed with, 20 parts of pyridine were added and the amount of toluene was at the same time reduced from 180 parts to 160 parts. After the same reaction time as in Example 4, the resulting acylated polyvinyl alcohol contained only 1.2 mole % of methacrylic ester groups as copolymerized units.

EXAMPLE 5

100 parts of a partially hydrolyzed polyvinyl propionate having a degree of hydrolysis of 88 mole % and a mean molecular weight of 30,000 were dispersed in a mixture of 180 parts of toluene, 20 parts of succinic anhydride and 1 part of p-dimethylaminopyridine, and the dispersion was stirred for 8 hours at 80° C. The resulting reaction product was filtered off, washed with acetone and dried. It contained 9 mole % of succinic half-ester groups as copolymerized units.

EXAMPLE 6

50 parts of the acylated polyvinyl alcohol prepared as described in Example 1 were dissolved in 50 parts of water at 80° C., and 40 parts of β-hydroxyethyl acrylate, 8 parts of trimethylolpropane triacrylate, 0.5 part of 2,4,6-trimethylbenzoyldiphenylphosphine oxide, 0.2 part of hydroquinone monomethyl ether and 0.02 part of eosin were added to this solution. The resulting mixture was applied onto a base to give a layer about 0.8 mm thick, which was then dried. Imagewise exposure to actinic light (360 nm) and washing out of the unexposed areas of the layer with water gave a relief which had very crisp edges and in which even fine relief elements were very resistant to washing out. The photopolymerizable layer possessed high photosensitivity.

EXAMPLE 7

The procedure described in Example 6 was followed, except that the mixture consisted of 70 parts of the methacrylated polyvinyl alcohol obtained in Example 2, 15 parts of β-hydroxyethyl methacrylate, 15 parts of butane-1,4-diol dimethacrylate, 1.2 parts of benzil dimethyl ketal, 0.1 part of hydroquinone and 0.02 part of N-nitrosophenylaniline. The properties of the photopolymerizable layer were similar to those of the photopolymerizable layer described in Example 6.

EXAMPLE 8

When Example 6 was repeated using the acylated polyvinyl alcohol prepared in Example 5, a photopolymerizable layer was obtained whose washout behavior could be controlled via the pH of the washout liquid.

We claim:
1. A process for the acylation of a polyvinyl alcohol comprising esterifying the polyvinyl alcohol with a carboxylic acid derivative suitable for acylation reactions, in the heterogeneous phase in an aprotic dispersant, in the presence of a pyridine derivative catalyst of the formula I

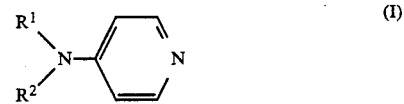

where $R^1$ and $R^2$ are each alkyl, or $R^1$ and $R^2$ together form an alkylene radical.

2. A process as claimed in claim 1, wherein the activated carboxylic acid derivative is an anhydride of a monocarboxylic or dicarboxylic acid.

3. A process as claimed in claim 1, wherein the activated carboxylic acid derivative is an activated derivative of an olefinically unsaturated carboxylic acid of 3 to 10 carbon atoms.

4. A process as claimed in claim 2 wherein the activated carboxylic acid derivative is an anhydride of an $\alpha,\beta$-olefinically unsaturated carboxylic acid of 3 or 4 carbon atoms.

5. A process as claimed in claim 1, wherein the polyvinyl alcohol is a hydrolyzed polyvinyl acetate in which more than 75 mole % of the acetate groups are hydrolyzed.

6. A process as claimed in claim 1, wherein the polyvinyl alcohol also contains copolymerized ethylene oxide units.

7. A process as claimed in claim 1, wherein the catalyst is p-dimethylaminopyridine.

8. A process as claimed in claim 1, wherein the catalyst is p-pyrrolidinopyridine.

9. A process as claimed in claim 1, wherein the esterification is further conducted in contact with one or more additional tertiary amines.

10. A process as claimed in claim 1, wherein the esterification is conducted at from 10° to 100° C.

11. A photopolymerizable or photocrosslinkable mixture which contains an acylated polyvinyl alcohol prepared by the process of claim 3, a photopolymerizable ethylenically unsaturated monomer or oligomer and a photoinitiator.

12. The process of claim 1, wherein the amount of catalyst of the formula I is from 0.1 to 15% by weight based on the polyvinyl alcohol.

13. The process of claim 12, wherein the alkyl is of 1 to 4 carbon atoms or $R^1$ and $R^2$ form an alkylene radical of 4 to 5 carbon atoms.

* * * * *